United States Patent [19] [11] Patent Number: 4,899,328
Ishii et al. [45] Date of Patent: Feb. 6, 1990

[54] DATA REPRODUCING APPARATUS AND METHOD FOR LOCKING A REPRODUCING HEAD

[75] Inventors: Masaru Ishii, Fujisawa; Kazuharu Odawara, Yokohama, both of Japan

[73] Assignee: Kabushiki Kaisha Toshiba, Kanagawa, Japan

[21] Appl. No.: 56,901

[22] Filed: Jun. 3, 1987

[30] Foreign Application Priority Data

Jun. 13, 1986 [JP] Japan ................................ 61-137881

[51] Int. Cl.⁴ ........................... G11B 3/10; G11B 7/00
[52] U.S. Cl. .................................... 369/77.2; 360/109; 369/244; 369/257; 369/292
[58] Field of Search ................... 369/75.2, 77.1, 77.2, 369/244, 270, 271, 292, 257; 360/86, 97, 98, 99, 107, 109

[56] References Cited

U.S. PATENT DOCUMENTS

| 3,788,648 | 1/1974 | Kawai | 369/257 |
| 4,574,372 | 3/1986 | d'Alayer | 369/257 |
| 4,602,361 | 7/1986 | Kumaki | 369/77.2 |
| 4,701,823 | 10/1987 | Sakurai | 360/75 |

Primary Examiner—Steven L. Stephan
Attorney, Agent, or Firm—Finnegan, Henderson, Farabow, Garrett & Dunner

[57] ABSTRACT

An apparatus for reproducing data from a data disc having a reproducing head opposite the data disc for processing data from the data disc. The apparatus includes a moving mechanism for moving the reproducing head between two radially separated positions along the radial direction of the data disc, and a locking device for automatically locking the reproducing head at one of the two positions for preventing movement of the reproducing head.

4 Claims, 6 Drawing Sheets

# DATA REPRODUCING APPARATUS AND METHOD FOR LOCKING A REPRODUCING HEAD

BACKGROUND OF THE INVENTION

1. Field of the Invention

The present invention relates to a data reproducing apparatus in which an optical head is accomodated. Particularly, it relates to a device for automatically locking and unlocking the optical head. Further, the present invention relates to a method for locking the optical head to prevent the movement thereof.

2. Description of the Related Art

In a data reproducing apparatus, an optical head is used either to record data onto a data disc, or to read from the data disc. The optical head is moved in a radial direction of the data disc, which is rotated in the apparatus.

When the power source of the data reproducing apparatus is turned off or while the data reproducing apparatus is being moved for installation, it is desirable that such an optical head be locked to a fixed member so that it cannot move, causing damage to the optical head.

Conventionally, a screw is used to lock the optical head in the above mentioned cases. However, with this arragement the locking and unlocking operations are troublesome and time-consuming.

SUMMARY OF THE INVENTION

It is an object of the present invention to provide a data reproducing apparatus in which a locking device for an optical head whereby locking and unlocking can be automatically performed.

It is another object of the present invention to provide a method for locking an optical head whereby the optical head is prevented from being damaged.

According to one aspect of the present invention, there is provided an apparatus for reproducing data from a data disc, including head means opposite the data disc for processing data from the data disc, comprising means for moving the head means between two radially separated positions along the radial direction of the data disc, means for automatically locking the head means at one of the two positions for preventing movement of the head means, and means for selectively actuating the locking means.

Preferably, the locking means includes a catching member mounted on the head means, and a hook member movably mounted at the one position for engaging with the catching member.

According to the other aspect of the present invention, ther is provided a method for locking an optical head which is movable along the radial direction of an optical disc between two radially separated positions, comprising the steps of manually actuating a control key for initiating the locking operation, automatically moving the head to one of the two positions in response to actuation of the control key, and locking the head at the one position for preventing movement of the optical head from the one position.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings of which.

DETAILED DESCRIPTION OF THE PREFERRED EMBODIMENT

One of the preferred embodiments of the preferred invention will be described with reference to the accompanying drawings.

In the present invention, a data reproducing apparatus comprises an optical head opposite an optical disc for receiving data from the optical disc and being movable along the optical disc, and a locking device for locking the optical head.

Figure 3:
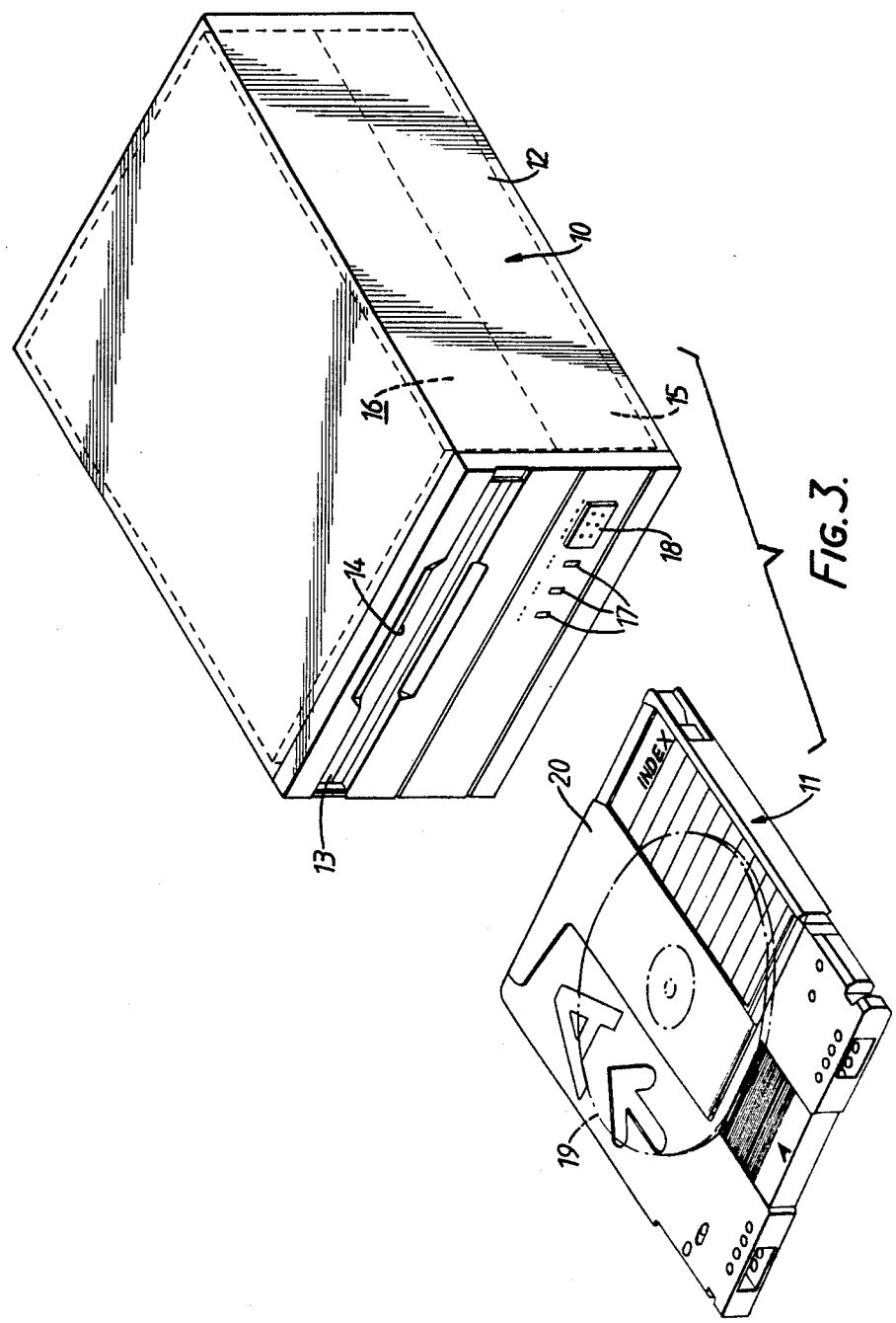
FIG. 3 is an exterior perspective view showing a data reproducing apparatus and a disc cartridge.

FIG. 3 shows an exterior view of a data reproducing apparatus 10 and a disc-containing cartridge 11 for use with this apparatus. The construction of reproducing apparatus 10 is as follows. At the front surface of a main body 12, a port 14 is formed and a shutter 13 is mounted to open and close port 14 for the insertion/removal of disc-containing cartridge 11. Inside main body 12 are housed a drive base mechanism 15, a loading mechanism 16, and a control circuit (not shown). A state indicator 17 and a cartridge eject switch 18 are disposed at the bottom right of the front of body 12. State indicator 17 indicates an apparatus operation state, a ready state or a cartridge inserted state. Cartridge eject switch 18 is pressed by an operator when disc cartridge 11 is ejected from main body 12 through port 14.

Disc-containing cartridge 11 (referred to below as "cartridge") has incorporated within it an optical disc 19 (referred to below as "disc"). Disc 19 has an outer diameter of about 130 mm with both sides A and B. At each surface of sides A and B, a data layer is formed to reproduce data with a laser beam or the like. It is also provided with a sliding shutter 20 for opening a window (not shown) which exposes a part of disc 19.

Figure 4:
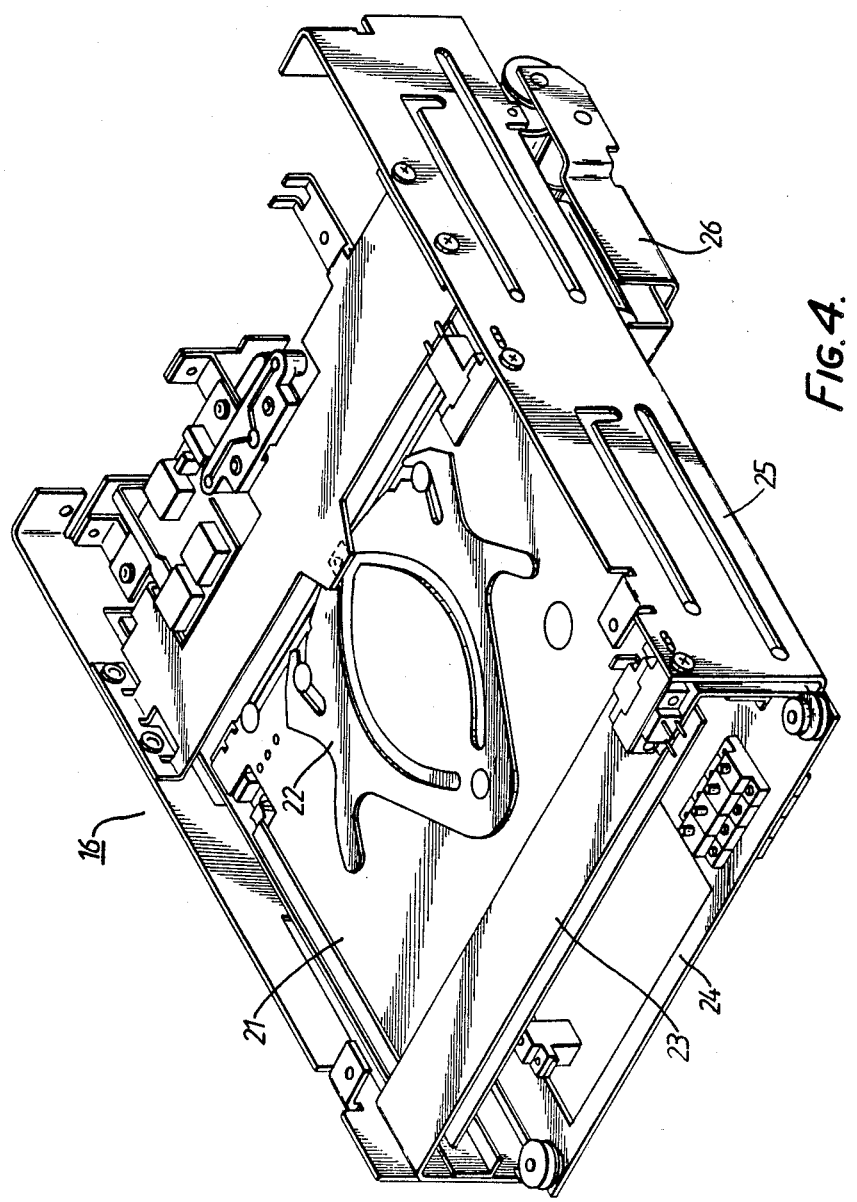
FIG. 4 is a perspective view showing a loading mechanism in a data reproducing apparatus.

Loading mechanism 16 is constructed such as shown in FIG. 4. It comprises a cartridge holder 21 for holding cartridges 11; a cartridge shutter opening mechanism 22 which is incorporated in cartridge holder 21 for opening and closing shutter 20 of cartridge 11; a movable cam member 23 that moves cartridge holder 21 to a prescribed position; loading guide plates 25 on both sides of a loading base 24 that guide movable cam member 23; and a loading motor unit 26 that constitutes the power source for driving movable cam member 23. Loading mechanism 16 operates so that cartridge 11 received into port 14 is loaded to a prescribed position, and cartridge 11 is unloaded from the prescribed position to port 14.

Figure 2:
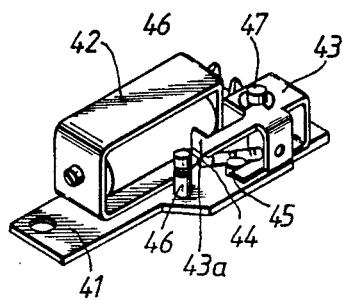
FIG. 2 is a perspective view showing a locking device for an optical head according to the present invention.

Drive base mechanism 15 is arranged below loading mechanism 16 as shown in FIG. 2.

Figure 5:
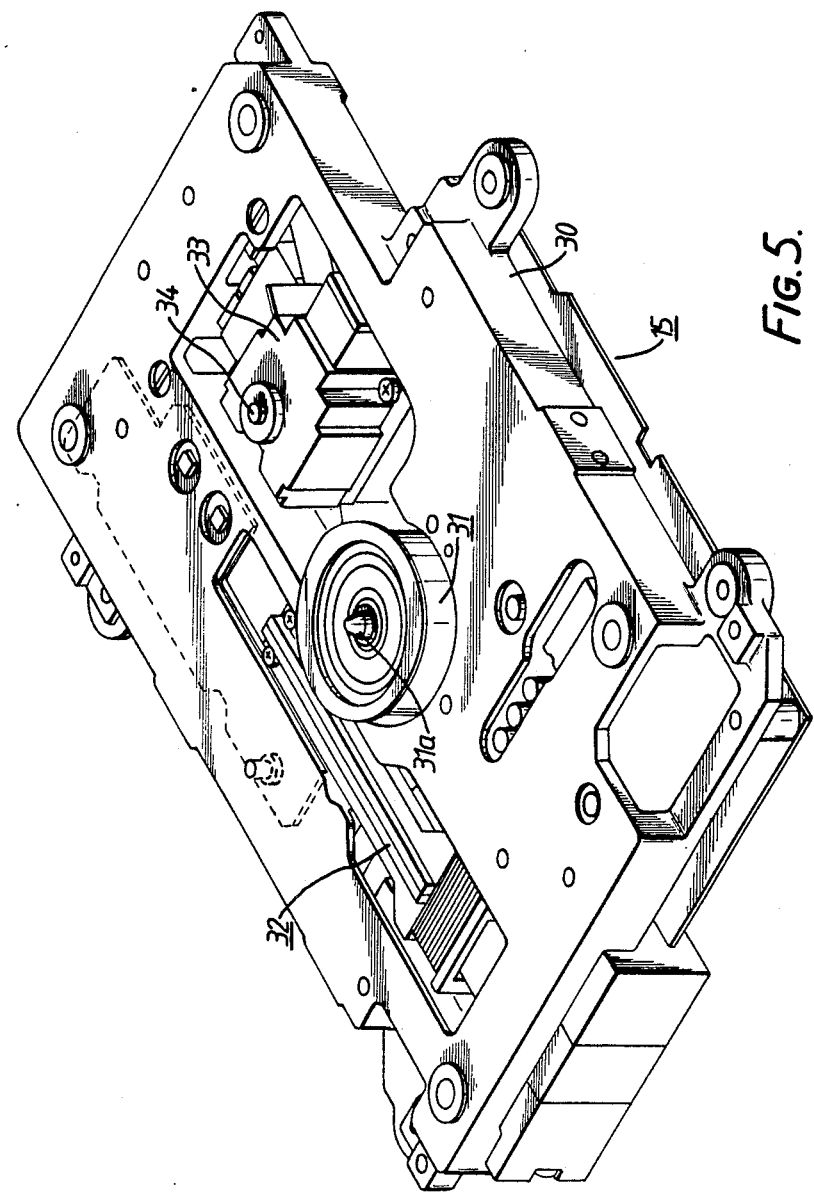
FIG. 5 is a perspective view showing a drive base mechanism, which is a component part of the apparatus.

Drive base mechanism 15 is constructed as shown in FIG. 5. On a disc base 30, a spindle motor 31 is mounted to hold disc 19 and drive it in the rotary direction. Also a drive unit 32 is mounted on disc base 30 to move a reproducing head 33 (referred to below as "optical head") in the radial direction of disc 19 to process data from the data layer on the underside of disc 19.

Figure 1:
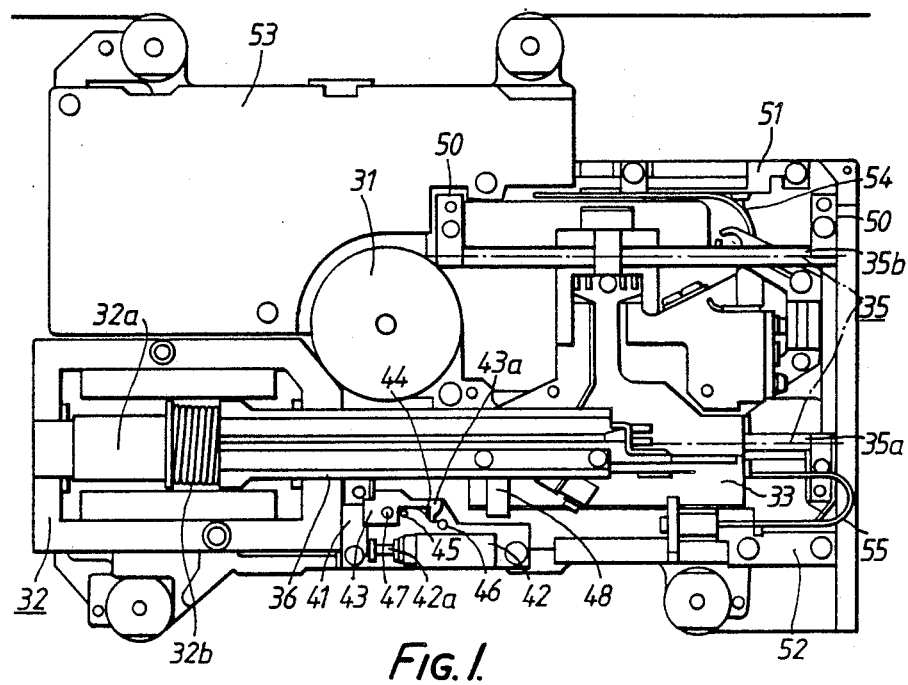
FIG. 1 is a bottom view showing a drive base mechanism in a data reproducing apparatus according to the present invention.

FIG. 1 shows the back of drive base mechanism 15. Optical head 33 is integrated with a light source (not shown) that generates a laser beam, an object lens 34 (see FIG. 4) that focuses the laser beam onto disc 19 in cartridge 11, and a detector that detects the reflected laser beam from disc 19. This optical head 33 is arranged so as to be capable of movement along a sliding shaft assembly 35 in the radial direction of disc 19. Sliding shaft assembly 35 comprises a main sliding shaft 35a and a sub-sliding shaft 35b. Main sliding shaft 35a guides linear movement of optical head 33 and sub-sliding shaft 35b further confines rotation by head's weight about main sliding shaft 35a.

Figure 6A:
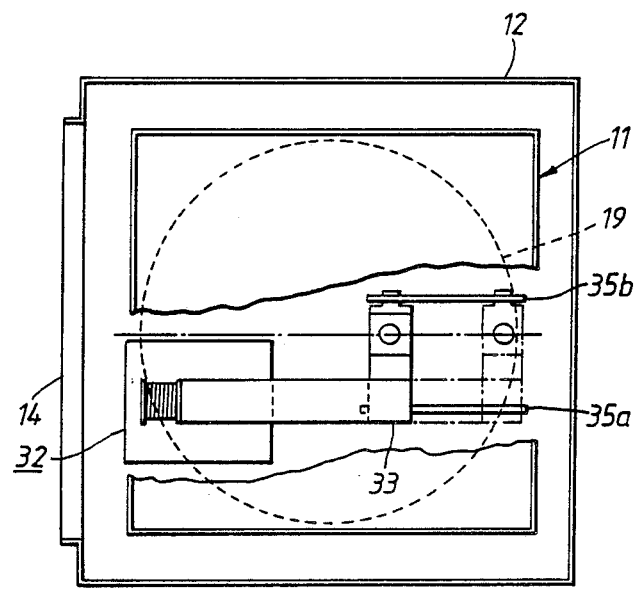
FIG. 6A is a plan view schematically showing the arrangement of an optical head and a drive unit in a data reproducing apparatus.
Figure 6B:
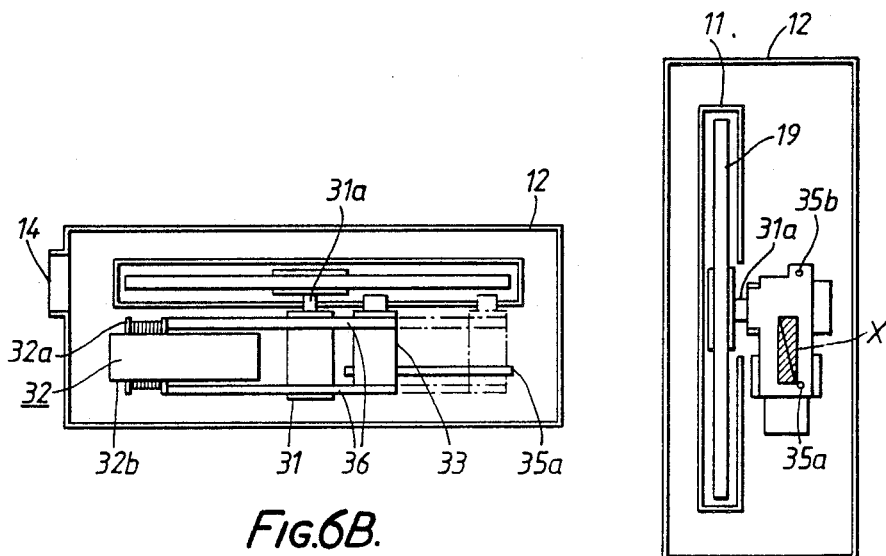
FIG. 6B is a side view schematically showing the arrangement of an optical head and a drive unit in a data reproducig apparatus shown in FIG. 6A.

In order to move optical head 33 there is provided drive unit 32 including a voice coil motor body 32a and bobbin 32b. This drive unit 32 is coupled with optical head 33 through a pair of connecting rods 36 so that optical head 33 is held along in the direction of main sliding shaft 35a, as shown in FIG. 6B. The range of movement of optical head 33 is defined on the other side of a rotary shaft 31a of spindle motor 31 to that of voice coil motor body 32a. The position of rotary shaft 31a constitutes the center of rotation of disc 19 and a boundary of the range of movement of optical head 33.

Figure 6C:
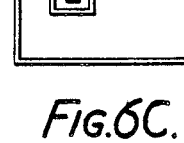
FIG. 6C is a rear view schematically showing the arrangement of an optical head and a drive unit in a data reproducing apparatus shown in FIG. 6A.

Optical head 33, main sliding shaft 35a, sub-sliding shaft 35b and drive unit 32 are arranged such that the resultant force applied to within the shaded imaginary rectangle X whose diagonal preferably is the line joining the center of gravity of optical head 33 and the axis of main sliding shaft 35a, as shown in FIG. 6C As shown in FIG. 6B, connecting rods 36 are axially arranged on either side of main sliding shaft 35a and the line of extension of this shaft.

A locking device is provided in order to maintain optical head 33 in the locked state during transportation of the data reproducing apparatus 10, or while operation of the apparatus is halted.

The major part of this locking device is constituted by a solenoid 42 and a hook member 43 having a claw 43a. This major part is shown in FIG. 2 and the whole locking device is shown in FIG. 1. In more detail, in this locking device, optical head 33 is put in locked condition by hook member 43 arresting a catching member 48 by the action of a spring 44. Catching member 48 is mounted on connecting rod 36.

Solenoid 42, whose a plunger 42a is thus linked to hook member 43, effects locking and unlocking of plunger 42a in response to changeover of an applied pulse signal from a control section (not shown). That is, maintenance of the locked state of plunger 42a is achieved by a permanent magnet (not shown) arranged at the rear of plunger 42a. While unlocking of plunger 42a is achieved by withdrawing plunger 42a by means of an electromagnet (not shown) which generates a magnetic force whose direction is such as to oppose the permanent magnet. Consequently, when plunger 42a is released either by stopping the application of a pulse to the electromagnet, or by applying a pulse such that the direction of magnetization of the electromagnet is the same as that of the permanent magnet, plunger 42a returns rearwardly due to the action of spring 44, thereby creating a locked condition.

In FIGS. 1 and 2, on a base plate 41, solenoid 42 is mounted and a projection 45 is projected for readjusting the rotation of hook member 43. Spring 44 is stretched between hook member 43 and a pin 46 mounted on base plate 41. Hook member 43 is rotatable about a shaft pin 47. Reference number 50 denotes fixing members for fixing sub-sliding shaft 35b on disc base 30, 51 and 52 denote guide members for guiding the movement of flexible cables 54 and 55, and 53 denotes a spindle moter base plate.

The construction of the front panel of data reproducing apparatus 10 will now be described.

Figure 7:
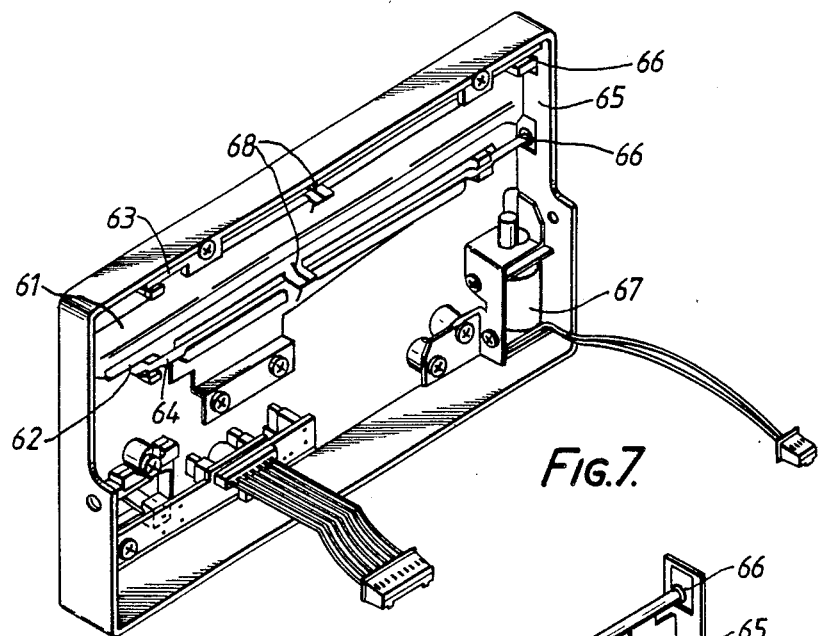
FIG. 7 is a perspective view showing a front shutter mechanism of a data reproducing apparatus.

The back of the front panel is constructed as shown in FIG. 7. On the front panel, shutter 13 seen from the front face of the front panel includes a pair of upper and lower shutter members 61 and 62, respectively. The closed condition of upper shutter member 61 and lower shutter member 62 is obtained as shown in FIG. 8 by the action of a spring, to be described.

A front shutter opening and closing mechanism is provided to open and close upper shutter member 61 and lower shutter member 62. In this front shutter mechanism, torsional coil springs 68 are respectively mounted on upper shaft 63 and lower shaft 64 about which upper shutter member 61 and lower shutter member 62 pivot, respectively. The closed state of uppe shutter member 61 and lower shutter member 62 is obtained by the spring action of these torsional coil springs 68.

Figure 8:
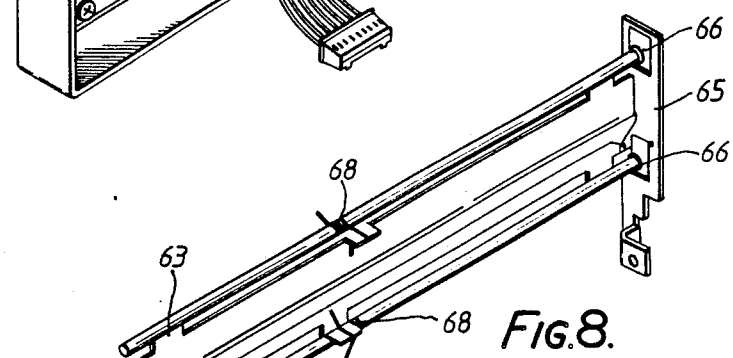
FIG. 8 is a perspective view showing a transmission mechanism of the front shutter mechanism shown in FIG. 7.

To perform the opening and closing action of this upper shutter member 61 and lower shutter member 62, a transmission mechanism including a rack 65 and pinions 66, as shown in FIG. 8, is provided between them and solenoid 67. By means of this transmission mechanism, the amount of movement of the plunger of solenoid 67 can be transmitted to upper shutter member 61 and lower shutter member 62. Opening of upper shutter member 61 and lower shutter member 62 can be performed either by inserting cartridge 11 into data reproducing apparatus 10 from shutter 13 (see FIG. 3), or by the drive action of the plunger of solenoid 67 (see FIGS. 7 and 8).

All of these members of the front shutter mechanism are of unitary construction with the front panel, as described above.

This embodiment of the present invention also includes a locking device for automatically locking optical head 33. This locking device comprises hook member 43 that puts optical head 33 in a locked condition by the action of spring 44, and solenoid 42, whose plunger 42a is linked to this hook member 43, and that locks and unlocks this plunger 42a in response to changeover of an applied pulse signal from the control section. Thus the locked and unlocked states of optical head 33 can be selected by the changeover action of solenoid 42 (see FIGS. 1 and 2). That is, optical head 33 is unlocked in response to application of a pulse signal from the control section to solenoid 42 when apparatus 10 is in a ready state. In the ready state, the recording or reproducing operation can be performed after cartridge 11 is loaded to a prescribed position by loading mechanism 16. Optical head 33 is locked in response to application of a pulse signal from the control section to solenoid 42 when the ready state of the recording or reproducing operation is releasedl. This occurs before the cartridge 11 is unloaded from the prescribed position to port 14 by loading mechanism 16. Thus, when the power to data reproducing apparatus 10 is turned off, the locking state of optical head 33 is maintained.

The operation of this locking device will now be explained in further detail. First of all, when the recording or reproducing operation in data reproducing apparatus 10 is commenced, optical head 33 has to move along sliding shaft assembly 35 in the left-right direction of FIG. 1, so locking of optical head 33 must be released.

This is achieved by hook member 43 being rotated counter-clockwise in FIG. 1 by withdrawal of plunger 42a of solenoid 42. Thus, there is no obstacle to the movement of catching member 48 mounted on optical head 33. This therefore, allows optical head 33 to move freely along sliding shaft assembly 35.

When the above recording or reproducing operation is completed, optical head 33 is shifted to a prescribed fixed position, then the control section applies a pulse signal to solenoid 42 to actuate plunger 42a linked to hook member 43. This causes hook member 43 to be rotated clockwise by the contracting force of spring 44, linked to hook member 43 and pin 46, until hook member 43 is halted by projection 45. During this action, catching member 48, which is fixed to optical head 33, moves within range of claw 43a of hook member 43 with the result that this catching member 48 engages the claw of hook member 43, securing optical head 33 so that it cannot move.

Release of the lock from this condition can be achieved by the withdrawal of plunger 42a of solenoid 42.

Figure 9:
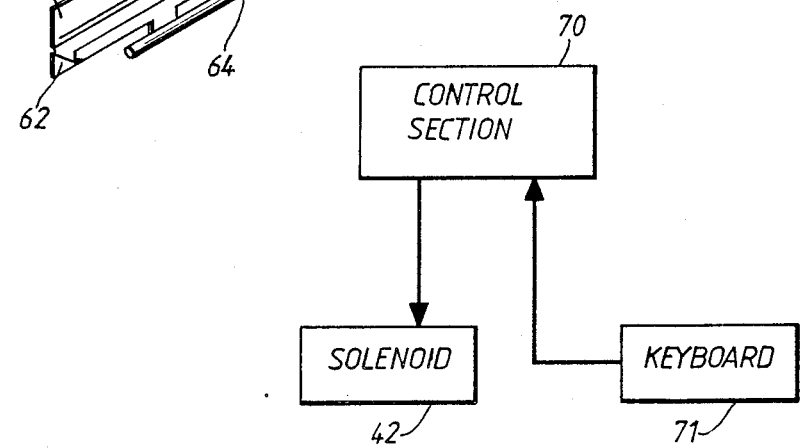
FIG. 9 is a circuit schmatic showing the control of a solenoid in a locking device.

Next, the timing of the locking or unlocking action of this locking device will be described with reference to FIG. 9.

Cartridge 11 is loaded into a prescribed position by loading mechanism 16. After that, a keyboard 71 is operated by an operator to command a control section 70 that the recording or reproducing operation be placed in the ready state, for example, a "start", or "record" command. Then, control section 70 feeds a pulse signal to solenoid 42 so that plunger 42a actuates to release the locking state between hook member 43 and catching member 48. As a result, since optical head 33 then can be moved along optical disc 19, the apparatus 10 is in the ready state for the recording or reproducing operation. When the recording or reproducing operation is completed, then control section 70 feeds a pulse signal to solenoid 42 in response to a command from keyboard 71, for example, an "end" key is pushed. Thus, plunger 42a actuates, so that hook member 43 rotates to lock with catching member 48 of optical head 33. As a result, since optical head 33 is locked, the apparatus 10 cannot record or reproduce. When an operator pushes eject switch 18 provided on the front panel of the apparatus 10, cartridge 11 is moved from the prescribed position to port 14 by loading mechanism 16. During this unloading operation of cartridge 11, the locking state of the locking device is maintained. Therefore, even though the power source to apparatus 10 is turned off, the locking state of the locking device is maintained.

According to the present invention, an optical head is automatically locked when the ready state of a data reproducing apparatusis released. Therefore, damage to the optical head due to movement can be prevented.

What is claimed is:

1. An apparatus for reproducing data from a data storage medium, comprising:
   head means, disposed opposite the data storage medium, for processing data from the data storage medium, said head means including a catching portion integrally formed thereon;
   means for moving the head means and said integral catching portion between first and second spaced positions along a radial direction of the data storage medium;
   lock means, having a hook member, for engaging with the catching portion of the head means, said hook member being configured to securely mate with said catching portion thereby preventing movement of the head means;
   means for manually inputting a start command signal to the moving means for initiating movement of said head means; and
   means for releasing the engaging state of the lock means in response to the start command signal from the start command signal input means.

2. The apparatus of claim 1 wherein said hook member of said lock means is movably mounted at said first spaced position for engaging with the catching portion of the head means.

3. The apparatus of claim 2 wherein the lock means further includes a solenoid having a plunger, said plunger being linked to the hook member.

4. The apparatus of claim 1 further comprising means for manually inputting an end command signal to the moving means for stopping movement of the head means, and means for actuating the lock means in response to the end command signal from the end command signal input means.

* * * * *